Aug. 5, 1969  D. A. LEONARD  3,460,053
MEANS FOR PRODUCING LONG GAS DISCHARGES
Filed Nov. 8, 1966

INVENTOR.
DONALD A. LEONARD
BY Harry A. Herbert Jr.
Sherman H. Goldman
ATTORNEYS : 3,460,053
Patented Aug. 5, 1969

3,460,053
MEANS FOR PRODUCING LONG GAS DISCHARGES
Donald A. Leonard, Stoneham, Mass., assignor to the United States of America as represented by the Secretary of the Air Force
Filed Nov. 8, 1966, Ser. No. 593,246
Int. Cl. H01s 3/09
U.S. Cl. 331—94.5                                2 Claims This invention relates generally to a method and apparatus for producing long-length gas discharges which are useful for lasers or laser amplifiers, and more particularly, to the achievement of this end by utilizing a voltage source much lower than that required to produce a given, required electric field across the total discharge path.

Laser devices utilize the maser principle of amplification of electromagnetic waves for operation in the infrared and optical regions. Lasers find a particular application with devices which utilize non-equilibrium processes in a gas discharge. Since the population of energy levels does not achieve an equilibrium distribution a laser action occurs. Although laser action can utilize a continuous discharge for continuous laser action, it has been found that pulsed gas discharges produce a greater departure from equilibrium with an opportunity to obtain increased power output. In order to create a gaseous discharge in the known type of lasers, a very high, pulsed electric field requiring a dangerously high, inconvenient and costly voltage source was required. Otherwise, the length of the gas discharge would have to be kept to a minimum.

The instant invention utilizes a particular shape for multiple electrodes distributed along the length of a gas containing tube with the adjacent electrodes being of alternate polarity such that a lower, pulsed voltage source may be utilized.

Accordingly, it is an object of this invention to provide a long-length gaseous discharge which is capable of use with pulsed lasers or laser amplifiers.

It is another object of this invention to produce a long-length gaseous discharge tube method and apparatus for laser or laser amplifier use which utilizes a pulsed voltage source much lower than that required to produce a given, required electric field across the total discharge path.

It is still another object of this invention to provide a long-length gaseous discharge tube arrangement by distributing electrodes of particular shape with alternating polarity along the discharge tube and applying a source of pulsed energy thereto.

A further object of this invention involves the provision of a long-length gaseous discharge apparatus and method which eliminates dangerously high and costly pulsed voltage sources.

A still further object of this invention involves the production of a multiple electrode gas discharge tube arrangement for a pulsed laser which encourages equal division of currents during the discharge procedure.

Another object of this invention involves the provision of a long-length gas discharge by an apparatus which is easy and economical to produce of conventional, currently available materials that lend themselves to mass manufacturing techniques.

These and other advantages, features and objects of the invention will become more apparent from the following description taken in connection with the illustrative embodiments in the accompanying drawings, wherein.

Figure 1:
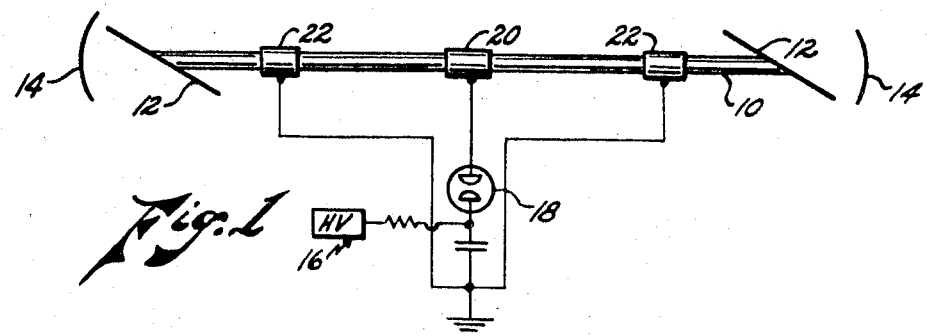
FIGURE 1 is a schematic representation of a gaseous discharge tube which utilizes an electrode arrangement which divides the unit into two sections.

Referring to FIGURE 1, there is shown an elongated optical tube 10 which may, for example, be of quartz, Vycor, etc. which is arranged to have an active gaseous medium therein. The gas may be nitrogen or a mixture of gases such as helium or neon as is well known in the in the laser art. The ends 12 of the optical tube 10 form transparent windows which are located at an angle to the axis of the laser tube in order to take advantage of the Brewster angle for the dielectric material forming the dielectric for the tube and ends. By utilizing the Brewster angular relationship, as is well known in the laser art, reflection of the light polarized in the plane of incidence is avoided. To complete the laser structure a pair of mirrors 14 which may be of planar spherical or confocal are provided in order to receive the energy beam from the laser in a manner well known in the art. In order to provide increased power from a laser, a pulsed energy supply is provided, as shown schematically at 16. The high voltage source is connected through a pressurized gap 18 to provide pulsed energy to an electrode 20 located in the center of the optical tube 10 while electrodes 22, adjacent the ends thereof, are connected to the grounded end of power supply. The tube 10 then exhibits the same characteristics as a tube of the same length which is pulsed across its ends with twice its voltage, i.e., the electric field has the same magnitude in both cases. Segmenting the voltage in this manner avoids the utilization of high electric fields and, therefore, longer optical tubes may be built with lower voltage source requirements.

Figure 2:
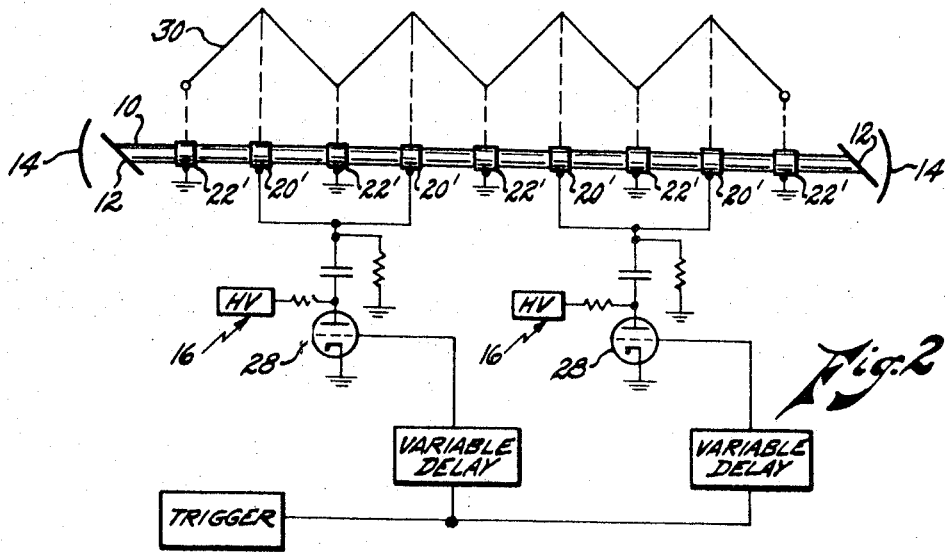
FIGURE 2 is a schematic representation of a multiple electrode operation of a unit with eight sections with the tube being driven by a pair of synchronized thyratrons.

Extension of the principle illustrated in FIGURE 1 has been applied to an eight section device as illustrated in FIGURE 2. In this embodiment, a pair of thyratrons 28 are provided with a variable relative delay in place of the pressurized gap 18 shown in FIGURE 1. This type of arrangement is useful for diagnostic purposes for pulse modulation and operation of long amplifier sections where the time of flight of the light pulse from the oscillator is comparable to or greater than the pulse width. Connected to the variable delays is a triggering means which is used to apply the high voltage to electrodes 20' while electrodes 22' are connected with ground potential. This would give a voltage wave form as illustrated at 30 immediately above the optical tube (as plotted along the length of the optical tube 10).

When the foregoing principles are applied to a large number of sections with a large number of electrodes, the geometry of each electrode and its lead-in wiring must provide a symmetry wherein each of the electrodes and each of the spacer elements between the electrodes are identical, respectively. Otherwise, it has been found that the currents do not divide evenly during discharge.

Figure 3:
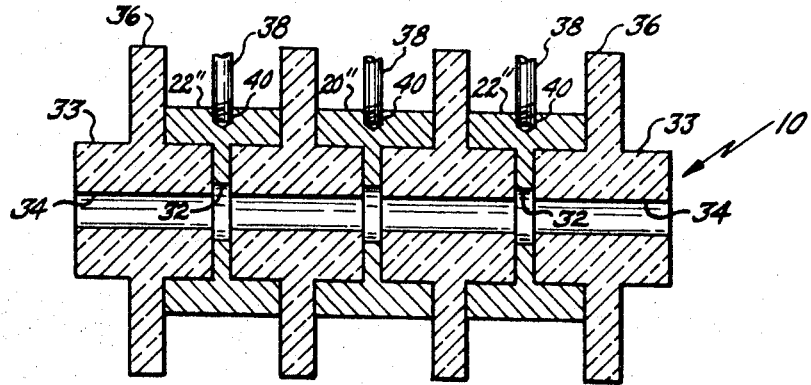
FIGURE 3 is a longitudinal cross section of a multiple electrode unit having a geometry which encourages equal current distribution during discharge.

The embodiment of FIGURE 3 was utilized with a pulsed $N_2$+ transition laser having 48 electrodes whereby a 15,000 volt potential difference between adjacent electrodes provided discharge tube characteristics equivalent to a 720,000 volt potential across the entire tube. The metal electrodes 20" and 22" in this embodiment, in order to enable equal current distribution between the segments of the tube, are made of metal and basically form cylinders having internal annular shoulders 32 which form spacer elements for the adjacent dielectric sections 33 of the optical tube 10. These sections are cylindrical in shape and have an internal bore 34 which is in alignment with the bore through the shoulders 32 of the electrodes 20" and 22". The dielectric elements 33 have an annular projection 36 in the form of an external shoulder on the outer periphery of the cylindrical element. Reproduction of this geometry for each of the spacer elements 33 and the geometry utilized for each of the electrodes 20″ and 22″ enables the equal division of currents along the length of the entire laser tube. Attachment of the pulsed power source wiring to each of the electrodes 20″ and 22″ may be achieved by inserting rod-like elements 38 in blind, tapped holes 40 which are symmetrically located in the metal electrodes. Adjacent electrodes would be of relatively opposite polarity.

From the foregoing, it can be seen that a particular geometry has been provided which enables the use of multiple electrodes with a pulsed power source to provide a high energy laser system. Although particular elements were defined relative to the construction of the device, it should be understood to those skilled in the art that the invention is capable of a variety of alternative embodiments which utilize materials and structures which are conventional in the laser field.

I claim:
1. A gaseous laser discharge tube comprising:
   hollow, dielectric cylinders, each having a centrally disposed, radially oriented, cylindrical flange on the external surface thereof, and
   hollow metallic, cylindrical electrodes, each having a centrally disposed, radially oriented, cylindrical flange on the internal surface thereof,
   said hollow dielectric cylinders and said hollow metallic electrodes being alternately disposed such that adjacent dielectric cylinders to said electrodes abut against the internal flanges of said electrodes while adjacent electrodes to said dielectric cylinders abut against the external flanges of said electrodes with the hollow interior of said electrodes and said dielectric cylinders forming a tubular container for a gaseous medium.
2. A laser discharge tube as defined in claim 1 including centrally located means on the external surface of said electrodes and extending radially therefrom for connection to a supply of electrical energy.

No references cited.

RONALD L. WIBERT, Primary Examiner

P. K. GODWIN, Assistant Examiner

U.S. Cl. X.R.

330—4